United States Patent
Qiu et al.

(10) Patent No.: US 10,991,080 B2
(45) Date of Patent: Apr. 27, 2021

(54) IMAGE ADJUSTMENT METHOD AND ASSOCIATED IMAGE PROCESSING CIRCUIT

(71) Applicant: Realtek Semiconductor Corp., HsinChu (TW)

(72) Inventors: Zhong-Yi Qiu, Taichung (TW); Wen-Tsung Huang, Chiayi (TW)

(73) Assignee: Realtek Semiconductor Corp., HsinChu (TW)

( * ) Notice: Subject to any disclaimer, the term of this patent is extended or adjusted under 35 U.S.C. 154(b) by 64 days.

(21) Appl. No.: 16/546,311

(22) Filed: Aug. 21, 2019

(65) Prior Publication Data
US 2020/0265559 A1     Aug. 20, 2020

(30) Foreign Application Priority Data
Feb. 19, 2019   (TW) ................ 108105436

(51) Int. Cl.
*G06K 9/00*     (2006.01)
*G06T 5/00*     (2006.01)
(Continued)

(52) U.S. Cl.
CPC ............ *G06T 5/003* (2013.01); *G06T 7/11* (2017.01); *G06T 7/90* (2017.01); *H04N 5/332* (2013.01);
(Continued)

(58) Field of Classification Search
CPC .......... H04N 1/40012; H04N 1/40018; H04N 1/40025; H04N 1/40031; H04N 1/40037;
(Continued)

(56) References Cited

U.S. PATENT DOCUMENTS

2010/0289885 A1    11/2010   Lu
2016/0057399 A1*   2/2016    Holub ................. G03B 27/547
                                              348/223.1
(Continued)

FOREIGN PATENT DOCUMENTS

| CN | 105845077 A | 8/2016 |
| TW | 201836343 A | 10/2018 |
| TW | 201907180 A | 2/2019 |

OTHER PUBLICATIONS

Zhong-Yi Qiu et al., Title of Invention: Image Adjustment Method and Associated Image Processing Circuit for Image Quality Improvement, U.S. Appl. No. 16/546,237, filed Aug. 20, 2019.

*Primary Examiner* — Duy M Dang
(74) *Attorney, Agent, or Firm* — Winston Hsu

(57) ABSTRACT

The present invention provides an image adjustment method and associated image processing circuit for performing the following operations upon each pixel of an image: obtaining R, G, B values and infrared ray (IR) value corresponding to the current pixel; generating multiple initial compensation parameters corresponding to the R, G, B values; generating an over-compensation parameter according to the R, G, B and IR values; comparing the over-compensation parameter with at least one threshold value to generate a compensation adjustment coefficient; and performing IR crosstalk compensation upon the image with the compensation adjustment coefficient.

18 Claims, 2 Drawing Sheets

(51) Int. Cl.
  *G06T 7/11*   (2017.01)
  *G06T 7/90*   (2017.01)
  *H04N 5/33*   (2006.01)

(52) U.S. Cl.
  CPC .............. *G06T 2207/10024* (2013.01); *G06T 2207/10048* (2013.01); *G06T 2207/20021* (2013.01)

(58) Field of Classification Search
  CPC ............ H04N 1/40043; H04N 1/4005; H04N 1/40056; H04N 1/40062; H04N 1/40068; H04N 1/40075; H04N 19/00024; H04N 19/00139; H04N 19/00315; H04N 19/00448; H04N 9/646; H04N 9/0451; H04N 17/002; H04N 17/02; H04N 5/332; H04N 9/04515; H04N 9/04553; G06T 5/003; G06T 7/11; G06T 7/90; G06T 2207/10024; G06T 2207/20021; G06T 2207/10048; G06T 5/50
  See application file for complete search history.

(56) References Cited

U.S. PATENT DOCUMENTS

2016/0225319 A1    8/2016  Lee
2017/0330347 A1*  11/2017  Ogatsu ................... G06K 9/036

* cited by examiner

IMAGE ADJUSTMENT METHOD AND ASSOCIATED IMAGE PROCESSING CIRCUIT

BACKGROUND OF THE INVENTION

1. Field of the Invention

The present invention relates to an image compensation technique, and more particularly, to a technique for compensating the infrared (IR) crosstalk, which is suitable for RGB-IR sensor and capable of automatically calculating suitable IR crosstalk parameters for a sensor.

2. Description of the Prior Art

Considering the existence of IR component in the ambient light, IR pixels in the hybrid R, G, B and IR filter array are utilized to absorb light. However, the crosstalk effects may occur in the RGB-IR spectrum, as shown in FIG. 2. The occurrence of the overlaps in FIG. 2 is caused mainly by the interference between the IR light and the RGB light. Conventional sensor manufacturing techniques so far are still unable to block or absorb non-color signals. Hence, when containing high IR component of light energy, the color of the object can be influenced by the IR crosstalk effect and thereby causes the color washout effect might occur on the color of the image of an object, such as color shifting. Further, the IR light may be oozed from a facial recognition system of a video system, or from yellowish light (such as a halogen lamp).

The document US2010/0289885A1 discloses compensating the IR crosstalk by deducting a certain proportion of IR value from each of the R, G, B values, respectively. The equations are shown as follows:

$$R_{new} = R_{ori} - k1 \times IR_{ori}$$

$$G_{new} = G_{ori} - k2 \times IR_{ori}$$

$$B_{new} = B_{ori} - k3 \times IR_{ori}$$

$$IR_{new} = IR_{ori}$$

wherein $R_{new}$, $G_{new}$, $B_{new}$ and $IR_{new}$ are the adjusted R, G, B values and the IR value respectively, $R_{ori}$, $G_{ori}$, $B_{ori}$ and $IR_{ori}$ are the original R, G, B values and the IR value respectively, and k1, k2 and k3 are constants set by the user according to the influence of the IR crosstalk. This related art, however, merely roughly cancels a slight amount of the influence introduced by the infrared ray rather than adjusting based on the actual influence, and thus may cause over-compensation or distortion in R, G, B colors. Take the compensation equation "$R\_{new} = R\_{ori} - k1*IR\_{ori}$" of the red light value as an example, although this compensation equation in general provides a certain amount of compensation effect, when $IR\_{ori}$ is too large, the compensation value will also increase, even making the value of $k1*IR\_{ori}$ greater than $R\_{ori}$. In this case, the calculated $R_{new}$ is obviously not correct, which is 0 or negative number). This phenomenon occurs more easily in an outdoor environment where the sunlight is strong or an indoor environment where the light emitted from a lamp contains a great portion of IR, making the IR crosstalk compensation value too high and thereby causing color shifting. More particularly, the image is more likely to be greenish.

Hence, there is a need for a novel method to solve the above problem without introducing side effects.

SUMMARY OF THE INVENTION

An objective of the present invention is to provide image adjustment method and associated image processing circuit, in order to improve the aforementioned problem encountered in related art techniques.

An embodiment of the present invention provides an image adjustment method for performing following operations upon each pixel of an image: obtaining R, G, B values and infrared ray (IR) value corresponding to the current pixel; generating multiple initial compensation parameters corresponding to the R, G, B values; generating an over-compensation parameter according to the R, G, B and IR values; comparing the over-compensation parameter with at least one threshold value to generate a compensation adjustment coefficient; and performing IR crosstalk compensation upon the image with the compensation adjustment coefficient.

An embodiment of the present invention provides an image processing circuit which comprises a storage unit and a processor. The storage unit is arranged to temporarily store data. The processor is arranged to receive an image and perform following operations upon each pixel of the image: obtaining R, G, B values and infrared ray (IR) value corresponding to a current pixel; generating multiple initial compensation parameters respectively corresponding to the R, G, B values; generating an over-compensation parameter according to the initial compensation parameters respectively corresponding to the R, G, B values and according to the IR value; comparing the over-compensation parameter with at least one threshold value, in order to generate a compensation adjustment coefficient; and using the compensation adjustment coefficient to perform IR crosstalk compensation upon the image.

Embodiments of the present invention may detect over-compensated areas region by region, and may apply a different adjustment parameter on each over-compensated area, thus preventing the over-compensation to the IR crosstalk.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
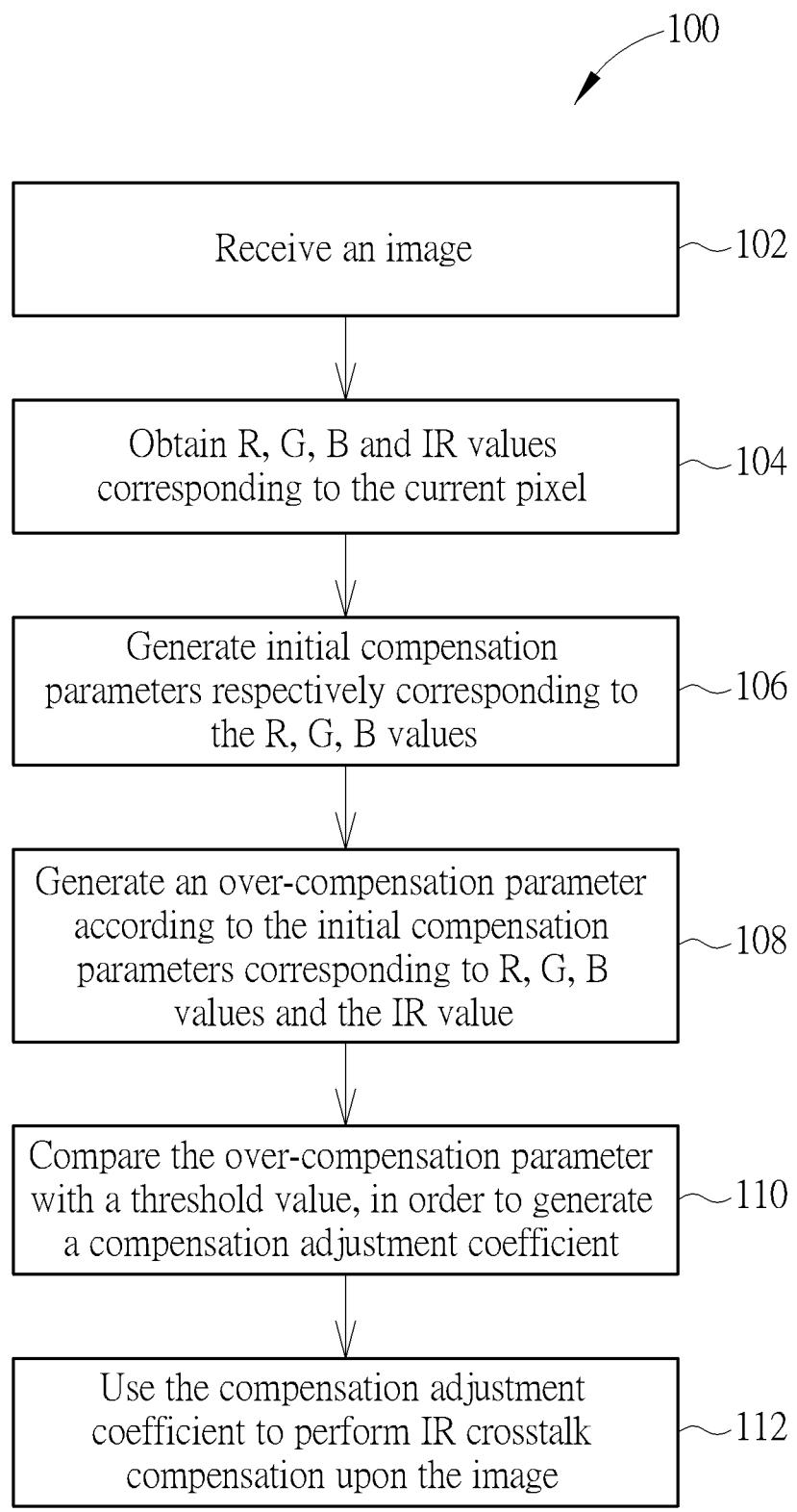
FIG. 1 is a flowchart illustrating an image compensation method according to an embodiment of the present invention.

Some phrases in the present specification and claims refer to specific elements; however, please note that the manufacturer might use different terms to refer to the same elements. Further, in the present specification and claims, the term "comprising" is open type and should not be viewed as the term "consists of." The term "electrically coupled" can refer to either direct connection or indirect connection between elements. Thus, if the specification describes that a first device is electrically coupled to a second device, the first device can be directly connected to the second device, or indirectly connected to the second device through other devices or means.

The present invention provides an IR crosstalk over-compensation preventing mechanism to solve the aforementioned problem encountered in related art techniques. Techniques of the present invention may be roughly categorized as "Detection of possible over-compensated areas" and "Adjustment of compensation parameters for over-compensated areas". The details are as follows.

I. Detection of Possible Over-Compensated Areas

Take the red light as example, since the over-compensation is caused by the value of "k1*IR_ori" being extremely close to R_ori or even greater than R_ori, k1*(IR_ori/R_ori) is chosen as a candidate compensation characteristic value. This method may also be used to determine the candidate compensation characteristic value corresponding to green light and blue light. The over-compensation characteristic value X can be determined by choosing the largest one from the candidate compensation characteristic values corresponding to R, G, B as, The larger the over-compensation characteristic value is, the higher possibility that the corresponding pixel is an over-compensated pixel. The over-compensation characteristic value X is calculated as the following equation:

$$X = \max \begin{cases} k1(i,j) * \frac{IR(i,j)}{R\_ori(i,j)} \\ k2(i,j) * \frac{IR(i,j)}{G\_ori(i,j)} \\ k3(i,j) * \frac{IR(i,j)}{B\_ori(i,j)} \end{cases}$$

wherein k1, k2 and k3 are the initial compensation coefficients corresponding to the R, G, B values respectively; IR(i, j), R_ori (i, j), G_ori(i, j) and B_ori(i, j) are primitive IR, R, G, B values of the current pixel respectively; and k1(i, j), k2 (i, j) and k3 (i, j) are IR crosstalk initial compensation parameters of R, G, B of the current pixel respectively.

II. Adjustment of Compensation Parameters for Over-Compensated Areas

This section illustrates the adjustment performed upon compensation parameters according to the over-compensation characteristic value X in order to obtain the compensation adjustment coefficient W_final, which may be presented in the following equation:

$$W\_final = \begin{cases} W1 \text{ or } 1, X < TH1 \\ W1 + (W2 - W1) * \frac{X - TH1}{TH2 - TH1}, TH1 < X < TH2 \\ W2, X > TH2 \end{cases}$$

wherein TH1, TH2 are the first, second over-compensation threshold values set by the user respectively, and W1, W2 are upper adjustment limit and lower adjustment limit set by the user respectively. For example, TH1, TH2 may be set as 0.8, 1.05 respectively, and W1, W2 may be set as 0.8, 0.6 respectively, but this is merely one possible parameter setting of the present invention and is not a limitation of the present invention. In addition, the above equation may be achieved via establishing a look-up table (LUT).

As can be seen from the first row of the aforementioned equation, when the over-compensation characteristic value X is lower than TH1 (e.g. lower than 0.8), since the possibility such a value causes over-compensation is relatively lower, the upper limit of the W_final value may be W1 or 1, that is to say, the adjustment may not be performed, or be performed in a reduced extent. For example, when X is lower than TH1, if there is no need for performing adjustment upon initial compensation parameter, the value of W_final can be set as 1. This is because the last outputted final compensation parameter k_final will be equal to the initial compensation parameter k multiplied by W_final, making the value of the final compensation parameter k_final remain at the value of the initial compensation parameter k. In another embodiment, when X is lower than TH1, the value of W_final can be W1 by only adjusting the initial compensation parameter. This can limit the difference between the final compensation parameter k_final and the initial compensation parameter k.

Next, please refer to the second row of the equation, when the over-compensation characteristic value X is between TH1, TH2, the value W will be adjusted in order to make the value of W_final exist between W1, W2, wherein the closer the X approaches TH1, the closer the W_final will approach W1. On the contrary, the closer the X approaches TH2, the closer the W_final will approach W2. As long as similar effects can be substantially achieved, the way of determining W_final can be modified. That is, the way of determining W_final does not necessarily need to follow the interpolation relationship shown in the second row of the above equation.

Next, please refer to the third row of the equation, when over-compensation characteristic value Xi is larger than TH2, it means the current environment is under extremely high IR value, such as an environment under strong sunlight. In this situation, W_final will be adjusted downward but will not be no lower than W2, so that the pixel will not be over downward-adjusted, in order to prevent from generating color shifting effects.

After W_final is obtained, the initial compensation parameters respectively corresponding to R, G, B are adjusted by being multiplied by the compensation adjustment coefficient W_final, in order to gain adjusted compensation parameters k1_final, k2_final and k3_final respectively corresponding to R, G, B. The associated equations are presented as follows:

$k1\_final = k1(i,j) * W\_final;$ $k2\_final = k2(i,j) * W\_final;$ and $k3\_final = k3(i,j) * W\_final;$ wherein k1_final, k2_final and k3_final are the final compensation coefficients respectively corresponding to R, G, B.

Next, the above final compensation parameters k1_final, k2_final and k3_final are used to perform IR crosstalk compensation. The associated equations are as follows:

$R\_final(i,j) = R\_ori(i,j) - k1\_final * IR(i,j);$ $G\_final(i,j) = G\_ori(i,j) - k2\_final * IR(i,j);$ and $B\_final(i,j) = B\_ori(i,j) - k3\_final * IR(i,j).$ wherein R_final (i, j), G_final (i, j) and B_final (i, j) are adjusted R, G, B values to be finally outputted, which may greatly improve the color shifting problem caused by over-compensation in conventional techniques, and may make the colors of the image more precise and realistic.

In view of the above, the present invention provides a characteristic value calculation method for detecting IR crosstalk over-compensation, and an IR crosstalk over-compensation parameter adjustment method. The present invention may effectively detect over-compensation areas in an image, and may apply a different adjustment parameter (e.g. a smaller one) on the over-compensation areas in order to prevent the IR crosstalk over-compensation effect. In addition, since each pixel of the image is performed with its own IR value detection, the present invention is capable of only adjusting the portions of the image where the IR crosstalk is over-compensated, without altering the portions of the image where the IR crosstalk is properly compensated or only mildly adjusting these portions.

Figure 2:
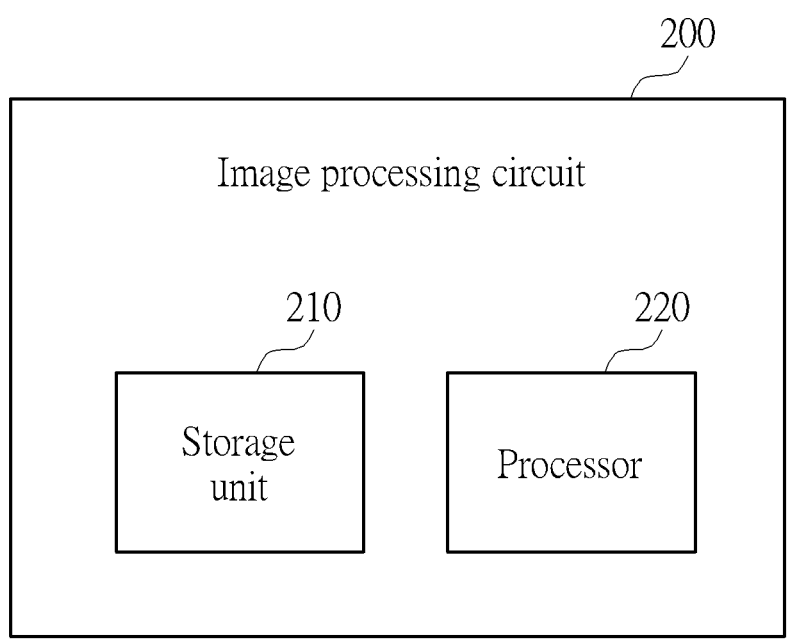
FIG. 2 is a diagram illustrating an image processing circuit corresponding to FIG. 1 according to an embodiment of the present invention.

The aforementioned invention concepts may be concluded as the image compensation method 100 shown in FIG. 1. If the result is substantially the same, the steps are not required to be executed in the exact order shown in FIG. 1. The flow shown in FIG. 1 may be adopted by the image processing circuit 200 shown in FIG. 2, wherein the image processing circuit 200 comprises a storage unit 210 and a processor 220, and the image processing circuit 200 may be applied to various cameras and video devices. The storage unit 210 is arranged to temporarily store data, and the processor 220 is arranged to execute the image compensation method 100 and perform various associated operations. The image compensation method 100 may be summarized as follows:

Step 102: Receive an image;
Step 104: Obtain R, G, B and IR values corresponding to the current pixel;
Step 106: Generate initial compensation parameters respectively corresponding to the R, G, B values;
Step 108: Generate an over-compensation parameter according to the initial compensation parameters corresponding to R, G, B values and the IR value;
Step 110: Compare the over-compensation parameter with a threshold value, in order to generate a compensation adjustment coefficient;
Step 112: Use the compensation adjustment coefficient to perform IR crosstalk compensation upon the image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjustment method for performing following operations upon each pixel of an image:
    obtaining R, G, B values and infrared ray (IR) value corresponding to the current pixel;
    generating multiple initial compensation parameters corresponding to the R, G, B values;
    generating an over-compensation parameter according to the R, G, B and IR values;
    comparing the over-compensation parameter with at least one threshold value to generate a compensation adjustment coefficient; and
    performing IR crosstalk compensation upon the image with the compensation adjustment coefficient.

2. The image adjustment method of claim 1, wherein the at least one threshold value comprises a first over-compensation threshold value, a second over-compensation threshold value, an upper adjustment limit and an lower adjustment limit; and the step of comparing the over-compensation parameter with at least one threshold value to generate the compensation adjustment coefficient comprises:
    comparing the over-compensation parameter with the over-compensation threshold value and the second over-compensation threshold value, and obtaining the compensation adjustment coefficient having a value between the upper adjustment limit and the lower adjustment limit according to a comparison result.

3. The image adjustment method of claim 2, wherein the step of comparing the over-compensation parameter with the over-compensation threshold value and the second over-compensation threshold value and obtaining the compensation adjustment coefficient having the value between the upper adjustment limit and the lower adjustment limit according to the comparison result is presented as the following equation:

$$W\_final = \begin{cases} W1, & X < TH1 \\ W1 + (W2 - W1) * \dfrac{X - TH1}{TH2 - TH1}, & TH1 < X < TH2 \\ W2, & X > TH2 \end{cases}$$

wherein TH1, TH2 are the first over-compensation threshold value and the second over-compensation threshold value respectively, the first over-compensation threshold value is not equal to the second over-compensation threshold value, W1, W2 are the upper adjustment limit and the lower adjustment limit respectively, X is the over-compensation parameter, and W_final is the compensation adjustment coefficient.

4. The image adjustment method of claim 3, wherein the first over-compensation threshold value and the second over-compensation threshold value are 0.8, 1.05 respectively, and the upper adjustment limit and the lower adjustment limit are 0.8, 0.6 respectively.

5. The image adjustment method of claim 1, wherein the at least one threshold value comprises a first over-compensation threshold value, a second over-compensation threshold value, an upper adjustment limit and a lower adjustment limit; and the step of comparing the over-compensation parameter with at least one threshold value to generate the compensation adjustment coefficient comprises:
    comparing the over-compensation parameter with the over-compensation threshold value and the second over-compensation threshold value, and referring to a comparison result to obtain the compensation adjustment coefficient having the value between 1 and the lower adjustment limit.

6. The image adjustment method of claim 5, wherein the step of comparing the over-compensation parameter with the over-compensation threshold value and the second over-compensation threshold value and obtaining the compensation adjustment coefficient having the value between 1 and the lower adjustment limit according to comparison result is presented as the following equation:

$$W\_final = \begin{cases} 1, & X < TH1 \\ W1 + (W2 - W1) * \dfrac{X - TH1}{TH2 - TH1}, & X < TH2 \\ W2, & X > TH2 \end{cases}$$

wherein TH1, TH2 are the first over-compensation threshold value and the second over-compensation threshold value respectively, the first over-compensation threshold value is not equal to the second over-compensation threshold value, W1, W2 are the upper adjustment limit and the lower adjustment limit respectively, X is the over-compensation parameter, and W_final is the compensation adjustment coefficient.

7. The image adjustment method of claim 6, wherein the first over-compensation threshold value and the second over-compensation threshold value are 0.8, 1.05 respectively, and the upper adjustment limit and the lower adjustment limit are 0.8, 0.6 respectively.

8. The image adjustment method of claim 1, wherein the step of performing IR crosstalk compensation upon the image with the compensation adjustment coefficient comprises:

generate final compensation parameters respectively corresponding to the R, G, B values according to the compensation adjustment coefficient and the initial compensation parameters respectively corresponding to the R, G, B values, wherein the final compensation parameters corresponding to the R, G, B values are presented by following equations:

$k1\_final = k1(i,j) * W\_final;$ $k2\_final = k2(i,j) * W\_final;$ and $k3\_final = k3(i,j) * W\_final;$ wherein k1_final, k2_final and k3_final are final compensation coefficients respectively corresponding to R, G, B, and W_final is the compensation adjustment coefficient.

9. The image adjustment method of claim 8, wherein the step of performing IR crosstalk compensation upon the image with the compensation adjustment coefficient further comprises:

respectively using the final compensation coefficients corresponding to R, G, B to generate final output R, G, B values corresponding to R, G, B, wherein the final output R, G, B values are presented by following equations:

$R\_final(i,j) = R\_ori(i,j) - k1\_final * IR(i,j);$ $G\_final(i,j) = G\_ori(i,j) - k2\_final * IR(i,j);$ and $B\_final(i,j) = B\_ori(i,j) - k3\_final * IR(i,j);$ wherein R_final(i, j), G_final(i, j) and B_final(i, j) are final output R, G, B values respectively, R_ori(i, j), G_ori(i, j), B_ori(i, j) and IR (i, j) are the R, G, B and IR values respectively, and (i, j) is the coordinate of a pixel.

10. An image processing circuit, comprising:
a processor, arranged to receive an image and perform following operations upon each pixel of the image:
obtaining R, G, B values and infrared ray (IR) value corresponding to a current pixel;
generating multiple initial compensation parameters respectively corresponding to the R, G, B values;
generating an over-compensation parameter according to the initial compensation parameters respectively corresponding to the R, G, B values and according to the IR value;
comparing the over-compensation parameter with at least one threshold value, in order to generate a compensation adjustment coefficient; and
using the compensation adjustment coefficient to perform IR crosstalk compensation upon the image.

11. The image processing circuit of claim 10, wherein the at least one threshold value comprises a first over-compensation threshold value, a second over-compensation threshold value, an upper adjustment limit and an lower adjustment limit; and the step of comparing the over-compensation parameter with at least one threshold value in order to generate the compensation adjustment coefficient comprises:

comparing the over-compensation parameter with the over-compensation threshold value and the second over-compensation threshold value, and according to a comparison result, obtaining the compensation adjustment coefficient with the size existing between the upper adjustment limit and the lower adjustment limit.

12. The image processing circuit of claim 11, wherein the step of comparing the over-compensation parameter with the over-compensation threshold value and the second over-compensation threshold value and obtaining the compensation adjustment coefficient with the size existing between the upper adjustment limit and the lower adjustment limit according to the comparison result is presented in following equation:

$$W\_final = \begin{cases} W1, & X < TH1 \\ W1 + (W2 - W1) * \dfrac{X - TH1}{TH2 - TH1}, & TH1 < X < TH2 \\ W2, & X > TH2 \end{cases}$$

wherein TH1, TH2 are the first over-compensation threshold value and the second over-compensation threshold value respectively, the first over-compensation threshold value is not equal to the second over-compensation threshold value, W1, W2 are the upper adjustment limit and the lower adjustment limit, respectively, X is the over-compensation parameter, and W_final is the compensation adjustment coefficient.

13. The image processing circuit of claim 12, wherein the first over-compensation threshold value and the second over-compensation threshold value are 0.8 and 1.05 respectively, and the upper adjustment limit and the lower adjustment limit are 0.8 and 0.6 respectively.

14. The image processing circuit of claim 10, wherein the at least one threshold value comprises a first over-compensation threshold value, a second over-compensation threshold value, an upper adjustment limit and an lower adjustment limit; and the step of comparing the over-compensation parameter with at least one threshold value in order to generate a compensation adjustment coefficient comprises:

comparing the over-compensation parameter with the over-compensation threshold value and the second over-compensation threshold value, and referring to a comparison result to obtain the compensation adjustment coefficient with the size existing between 1 and the lower adjustment limit.

15. The image processing circuit of claim 14, wherein the step of comparing the over-compensation parameter with the over-compensation threshold value and the second over-compensation threshold value and obtaining the compensation adjustment coefficient with the size existing between 1 and the lower adjustment limit according to the comparison result is presented by the following equation:

$$W\_final = \begin{cases} 1, & X < TH1 \\ W1 + (W2 - W1) * \dfrac{X - TH1}{TH2 - TH1}, & X < TH2 \\ W2, & X > TH2 \end{cases}$$

wherein TH1, TH2 are the first over-compensation threshold value and the second over-compensation threshold value respectively, the first over-compensation threshold value is not equal to the second over-compensation threshold value, W1, W2 are the upper adjustment limit and the lower adjustment limit respectively, X is the over-compensation parameter, and W_final is the compensation adjustment coefficient.

16. The image processing circuit of claim 15, wherein the first over-compensation threshold value and the second over-compensation threshold value are 0.8 and 1.05 respectively, and the upper adjustment limit and the lower adjustment limit are 0.8 and 0.6 respectively.

17. The image processing circuit of claim 10, wherein the step of using the compensation adjustment coefficient to perform IR crosstalk compensation upon the image comprises:

generating final compensation parameters respectively corresponding to the R, G, B values according to the compensation adjustment coefficient and the initial compensation parameters respectively corresponding to the R, G, B values, wherein the final compensation parameters corresponding to the R, G, B values are presented by following equations:

$k1\_final = k1(i,j) * W\_final;$ $k2\_final = k2(i,j) * W\_final;$ and $k3\_final = k3(i,j) * W\_final;$ wherein k1_final, k2_final and k3_final are final compensation coefficients respectively corresponding to R, G, B, and W_final is the compensation adjustment coefficient.

18. The image processing circuit of claim 17, wherein the step of using the compensation adjustment coefficient to perform IR crosstalk compensation upon the image comprises:

respectively using the final compensation coefficients corresponding to R, G, B to generate final output R, G, B values corresponding to R, G, B, wherein the final output R, G, B values are presented by following equations:

$R\_final(i,j) = R\_ori(i,j) - k1\_final * IR(i,j);$ $G\_final(i,j) = G\_ori(i,j) - k2\_final * IR(i,j);$ and $B\_final(i,j) = B\_ori(i,j) - k3\_final * IR(i,j);$ wherein R_final(i, j), G_final(i, j) and B_final (i, j) are final output R, G, B values respectively, R_ori(i, j), G_ori(i, j), B_ori(i, j) and IR (i, j) are the R, G, B and IR values respectively, and (i, j) is the coordinate of a pixel.

* * * * *